Feb. 9, 1926.
J. TESSIER
1,572,252
MOTION PICTURE APPARATUS
Filed May 3, 1920
5 Sheets-Sheet 1
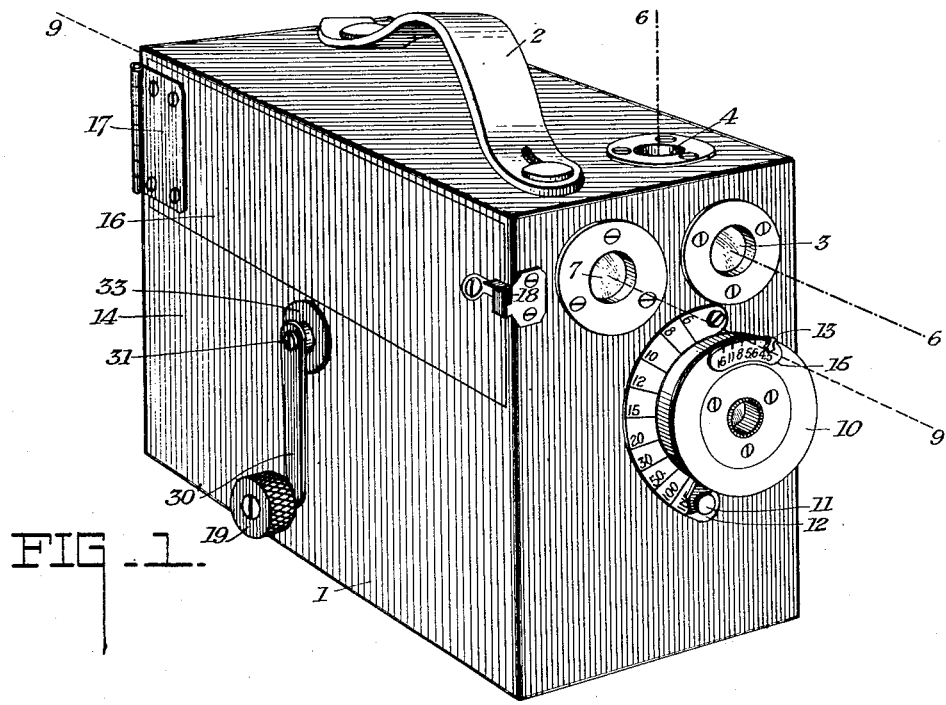
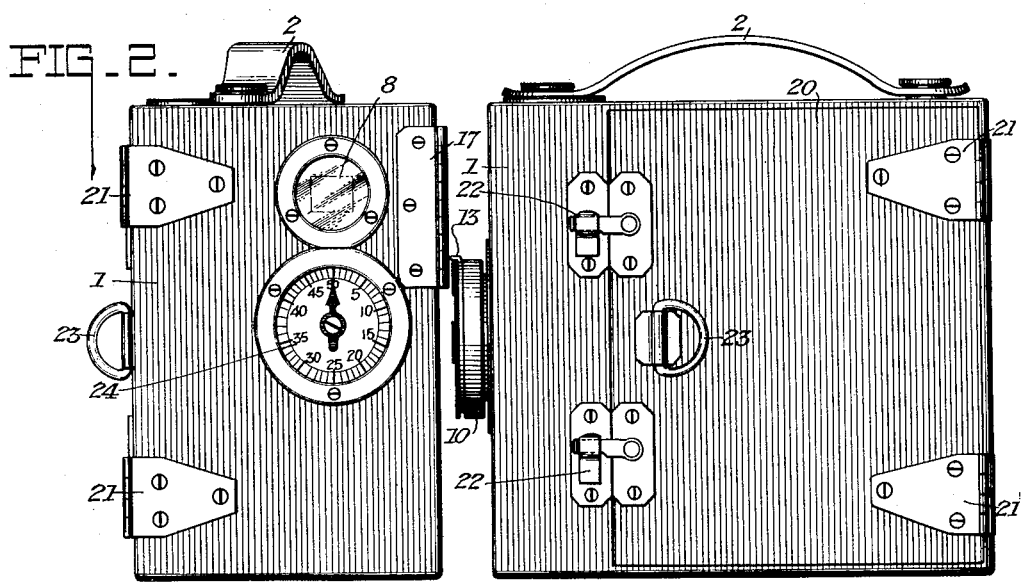
WITNESSES:
INVENTOR
*Julien Tessier*,
BY
ATTORNEYS.

Feb. 9, 1926.

J. TESSIER 1,572,252

MOTION PICTURE APPARATUS

Filed May 3, 1920  5 Sheets-Sheet 2

WITNESSES:

INVENTOR.
Julien Tessier;
BY R. L. Stunchfield
N. M. Perins
ATTORNEYS.

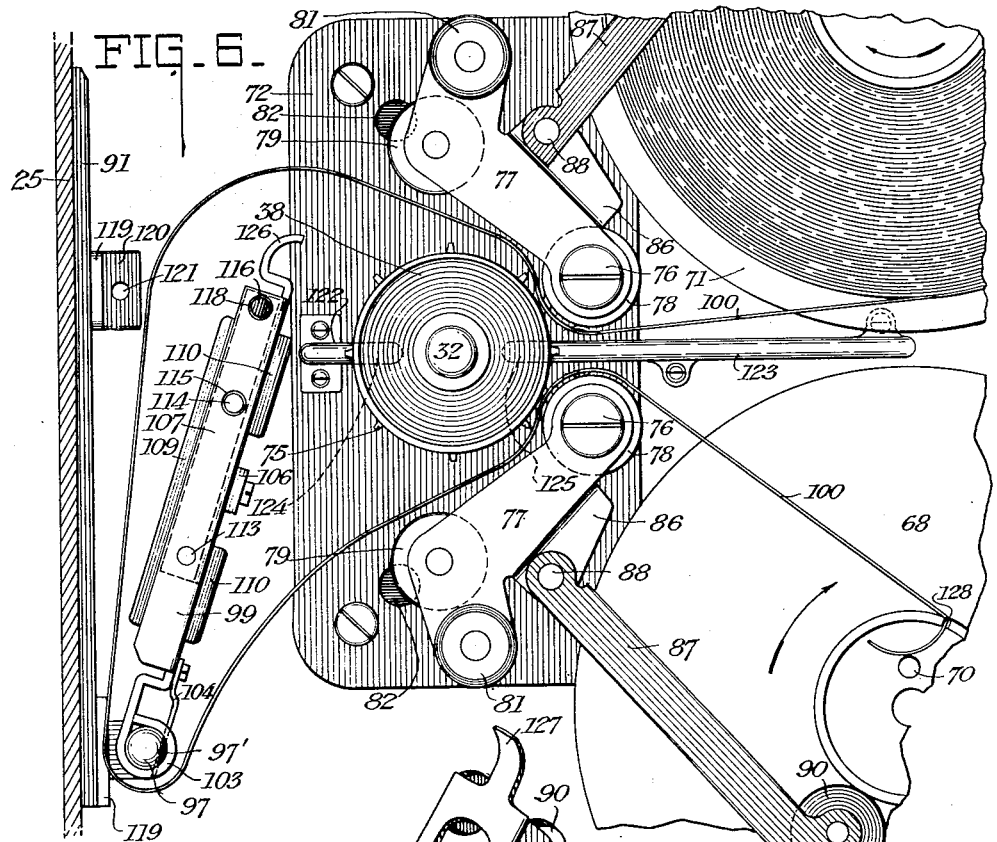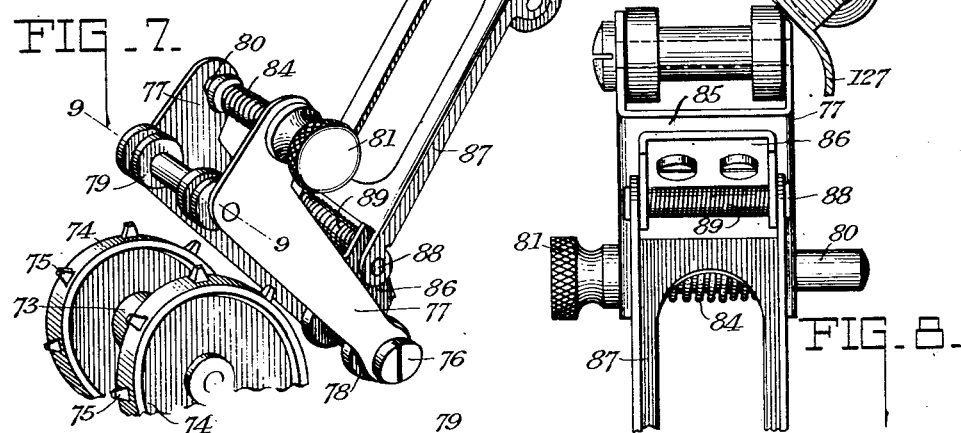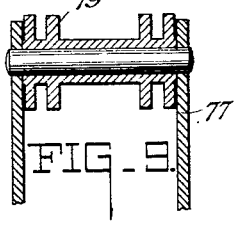

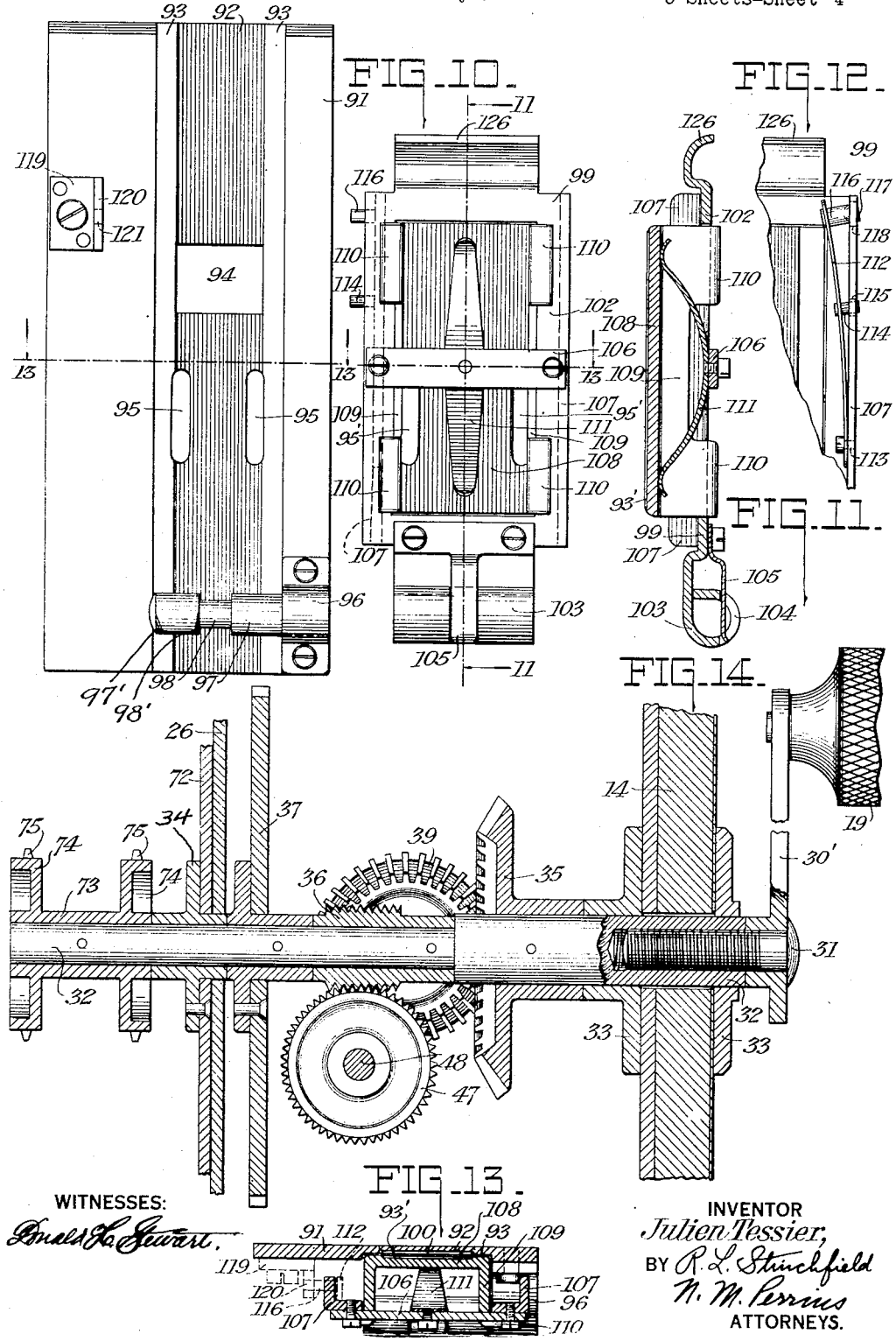

Feb. 9, 1926.  1,572,252
J. TESSIER
MOTION PICTURE APPARATUS
Filed May 3, 1920    5 Sheets-Sheet 5

WITNESSES:
Donald H. Stewart

INVENTOR
Julien Tessier,
BY R. L. Stinchfield
N. M. Perrins
ATTORNEYS.

Patented Feb. 9, 1926.

1,572,252

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

MOTION-PICTURE APPARATUS.

Application filed May 3, 1920. Serial No. 378,616.

*To all whom it may concern:*

Be it known that I, JULIEN TESSIER, citizen of the Republic of France, residing at Rochester, in the county of Monroe and State of New York, have invented certain new and useful Improvements in Motion-Picture Apparatus, of which the following is a full, clear, and exact specification.

My invention relates to motion picture apparatus and more particularly to cameras designed for the taking of motion pictures by amateurs. To that end, the objects of my invention are to provide a camera that is compact and easy to operate so that it can be conveniently carried around; that has no complicated parts or delicate mechanism requiring any high degree of care or precision in their operation; that is sturdy in construction; and particularly that is capable of being loaded and unloaded in daylight and into which the film may be threaded with the greatest possible ease and convenience, so that the conditions of use, operation, and ease of handling will be in every way similar to those attending the use by an amateur of the familiar types of roll film hand cameras.

To obtain these desirable objects, I have designed a camera of the box type, the interior of which is readily accessible. By the opening of a single door, all the mechanism which the user need handle in changing films becomes accessible, and this mechanism is so designed that all the motions of insertion of film are in a direction directly into the camera. The reels are inserted directly upon protruding spindles and the film is passed edgewise directly into the places designed for its passage so that it is unnecessary to thread it through any closed passages, or to twist or bend it except in a longitudinal direction.

The details of the mechanisms by which these objects are attained and other objects will be evident in the following description.

Figure 4:
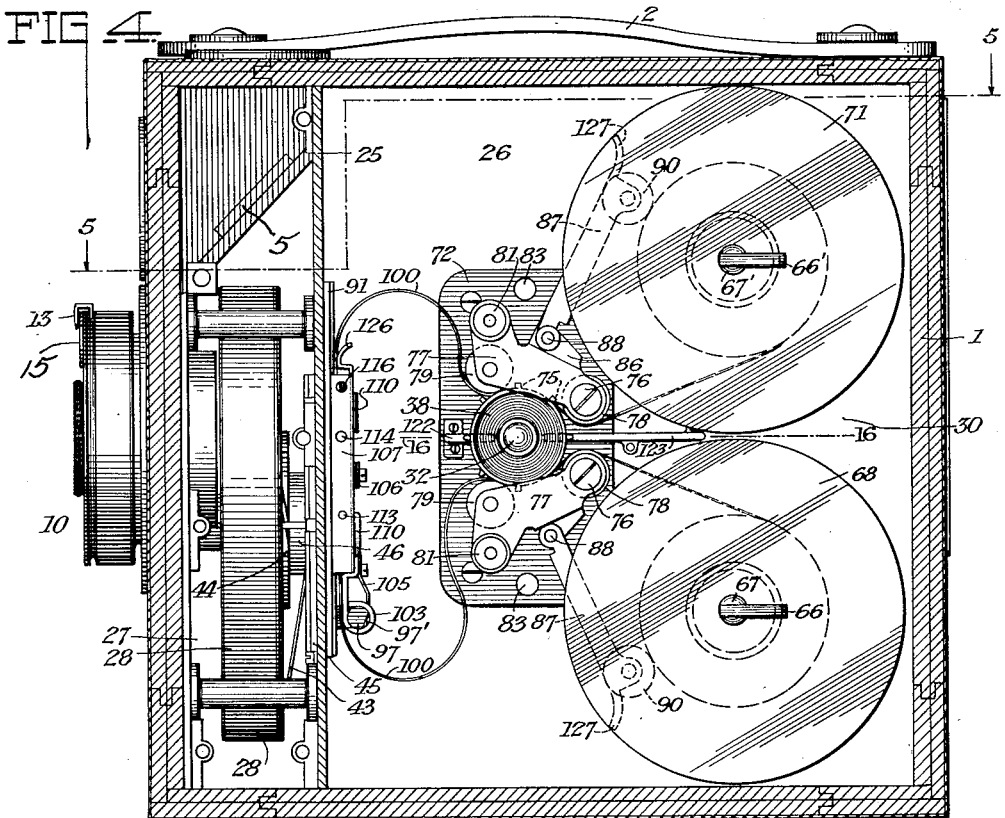
Figure 5:
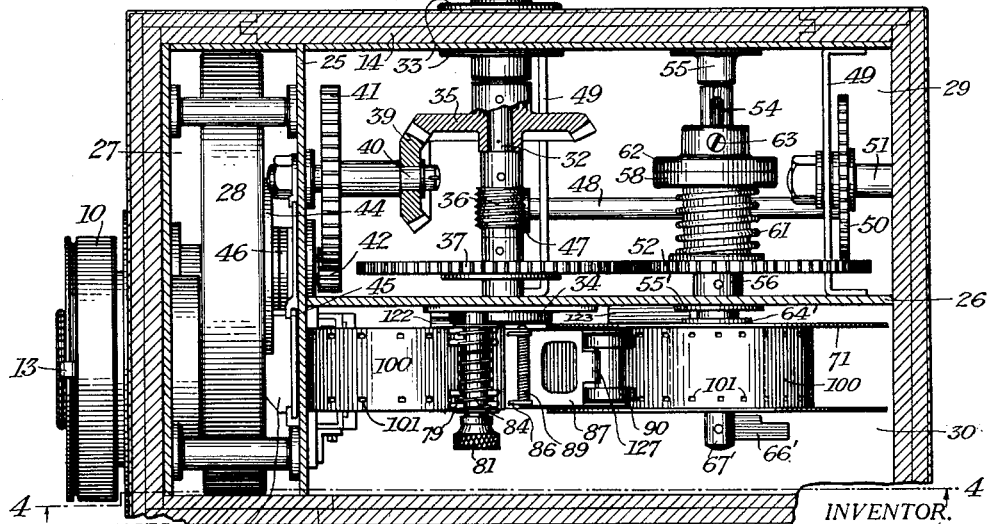

Referring now to the accompanying drawings in which the same reference characters refer to the same parts throughout, Fig. 1 is a perspective view of my camera as in use, Fig. 2 is a rear elevation thereof, Fig. 3 is a side elevation thereof, Fig. 4 is a sectional view taken on line 4—4 of Fig. 5, Fig. 5 is a sectional plan view, taken on line 5—5 of Fig. 4, certain parts being shown broken away.

Figure 15:
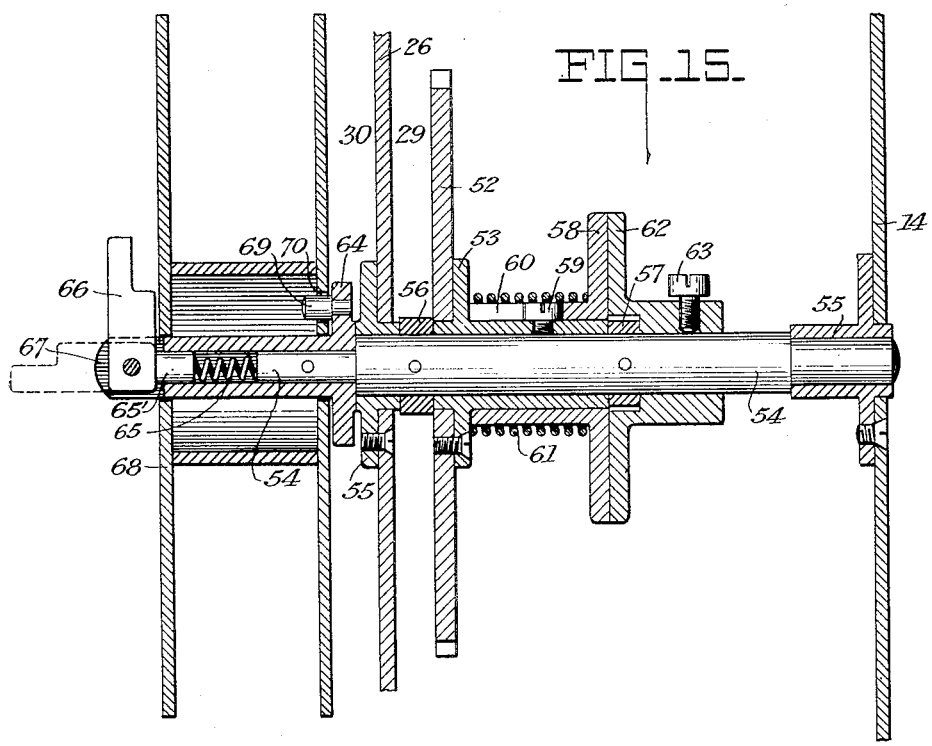

Fig. 6 is an enlarged elevation of part of the mechanism shown in Fig. 4,

Fig. 7 is a perspective view of a pressure member that cooperates with the driving sprocket, a portion of which is also shown, Fig. 8 is a plan view of a portion of this pressure member, Fig. 9 is a fragmentary section taken on line 9—9 of Fig. 7, Fig. 10 is an elevation of the gate and the pressure member therefor shown separated, Fig. 11 is a section of the pressure member taken on line 11—11 of Fig. 10, Fig. 12 is a fragmentary view of the pressure member showing the latch, Fig. 13 is a section of the gate and pressure member assembled, the section of the parts being that taken on line 13—13—13 of Fig. 10, Fig. 14 is a fragmentary view, largely in section, of the details of the main driving shaft and related mechanism, Fig. 15 is a sectional view of the shaft on which the take up reel is mounted showing the friction drive and related mechanism.

Figure 16:
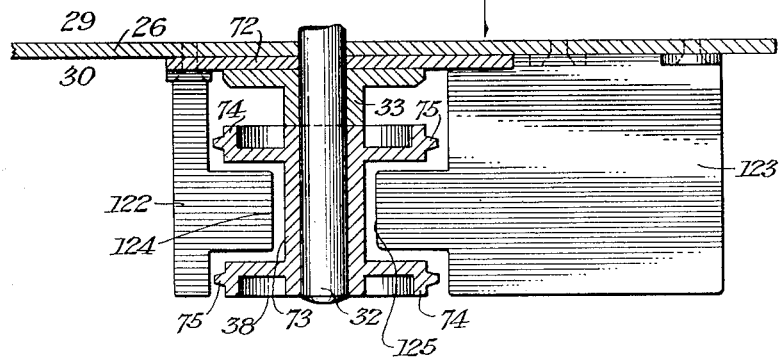

Fig. 16 is a section on line 16—16 of of Fig. 4, the parts being shown in elevation.

This camera as a whole is designated as 1 and embodies a box-like casing having a carrying handle 2 of familiar type. It has two finders, one of the usual reflecting type, comprising front and top lenses 3 and 4, and a mirror 5. The line of sight through this finder is indicated by the dot and dash line 6—6. The other finder is a direct view finder of the telescope type built into and through the body of the camera. The front lens is designated 7, the rear one 8, and the dash line of sight 9—9. This finder is not shown in Figs. 4 and 5 for the sake of clearness. On the front of the camera is lens mount 10, which is so constructed that the lens may be focused by movement of pointer 11 with reference to scale 12, and the diaphragm may be adjusted by movement of pointer 13 along scale 15. The details of these adjustments are not here described, as they are not claimed in this application.

In one side wall 14 is a door 16, hinged at 17 and with a latch at 18, and the operating handle 19 is also mounted upon this wall. This handle is omitted from Figs. 2 and 5 to economize space. Upon the other side of the camera is a light tight door 20 with hinges 21, latches 22 and a handle 23. On the rear of the camera is an indicator 24 actuated by mechanism hereinafter described that indicates the amount of film used.

The camera is interiorly divided by a transverse partition 25 and a longitudinal partition 26 into three compartments, in the front one of which 27 is mounted the shutter 28 and the film advancing mechanism; and in the other compartments 29 and 30 are mounted respectively the driving gearing and the film supply, feed and guiding mechanism.

The handle 19 is mounted on a crank arm 30′, rigidly attached by a screw 31 to the end of a shaft 32, mounted in bearings 33 in wall 14, and bearings 34 in partition 26. Upon this shaft are rigidly mounted the bevel gear 35, worm 36, and gear 37, all within compartment 29, and the driving sprocket wheel 38 within compartment 30. Mounted on partition 25 is shaft 40 which carries rigidly thereon bevel gear 39 intermeshing with 35, and gear 41, which drives gear 42, which is mounted on the axis of shutter 28. The shutter 28 has a heavy weighted rim so that it acts as a fly wheel and carries cams by which the film advancing mechanism is actuated. As the details of this mechanism are not claimed in this application and are not necessary to an understanding of the invention here claimed they will not be described fully. It is sufficient to state that member 43 carries film engaging fingers (not shown) and is moved in and out by cam 44, and up and down by a slide 45 actuated by a cam 46, both cams being carried by the shutter.

Worm 36, engages a worm gear 47, on shaft 48, carried in suitable supports 49, and this drives through gearing 50, and shaft 51, the indicator 24.

Gear 37 meshes with and drives gear 52 rigidly secured on a collar 53 loosely mounted on shaft 54, which is mounted in suitable bearings 55 in partition 26 and the inner part of wall 14. The collar 53 is prevented from longitudinal movement by collars 56 and 57 rigid on shaft 54. Collar 53 carries a flange 58, which rotates therewith but is free to slide longitudinally by reason of the screw 59 engaging in slot 60, and is pressed outwardly by spring 61. Collar 62 is rigidly carried by shaft 54, being secured thereto by screw 63. The contacting faces of 58 and 62 constitute frictional driving surfaces, permitting slip. Collar 62 may be adjusted and collar 57 is so dimensioned that collar 53 may slip thereon and remain in contact with 62 within certain limits of adjustment, thus affording a means of varying the pressure between the frictional driving surfaces. The above described mechanism is within compartment 29, and shaft 54 also carries in compartment 30, a collar 64 rigidly secured thereto, and extending beyond its end. Within this collar is a spring 65, which acts against the end of shaft 54 and a block 65′ sliding in collar 64, and engaging a latch 66, pivoted between extending lugs 67 on collar 64, to hold the same in extended or latching position. This arrangement constitutes an open ended spindle upon which a take-up reel 68 may be readily inserted. A lug 69 on collar 64 engages an aperture 70 in the reel to cause it to rotate therewith. It is thus evident that an adjustable friction drive is established between the driving handle and the take-up reel.

In partition 26, is also mounted a second spindle, the visible parts of which are designated on the drawing at 55′, 64′, 66′, and 67′, these parts corresponding to 55, 64, 66, and 67 already described. This constitutes a second spindle upon which the supply reel 71 is mounted and is free to turn, there being no lug corresponding to 69.

Mounted on partition 26 is a plate 72, through which protrudes shaft 32 carrying the driving sprocket wheel 38. This wheel comprises an axial collar 73 with edge flanges 74 carrying teeth 75 adapted to engage the perforations 101 of the film 100. Mounted in plate 72 are screws 76, upon which are pivoted the elbowed pressure members consisting of sheets of metal struck up from plates 77 connected by webs of metal 85. Between these plates on the screws 76 are rollers 78, adapted to contact the edges only of the film and at the elbows thereof are the rollers 79, so shaped as to contact the edges only of the film as it passes over the sprocket wheel 38, but grooved so as not to interfere with teeth 75, and at the ends thereof are the latches consisting of shafts 80 with handles 81, the ends of the shafts being adapted to engage holes 82 and 83 in plate 72 to latch the pressure members in operative and inoperative positions respectively. Springs 84 normally press the shafts into engaging position, from which they may be withdrawn by the handles.

Upon each pressure member are ears 86, upon which are pivoted other pressure members 87 by means of a shaft 88, around which is a spring 89. These members 87 carry at their free ends rollers 90; and springs 89 exert sufficient pressure on the members 87 to maintain the rollers 90 in contact with the roll of film on the reels 68 and 71.

Carried by partition 25 is a plate 91 which forms the exposure gate of the camera. In this plate is a groove 92 the width of the film, the central part of the groove being somewhat deeper than the edge portions which thus constitute shoulders 93 which the edge portions only of the film 100 contact. An aperture 94 is formed in this groove and determines the exposure field of the camera. Apertures 95 are provided for the film advancing fingers referred to above. Suitable apertures (not shown) are, of course, made in the partition 25. Near the bottom of this plate is an abutment 96 supporting a pintle 97, having a recess or groove 98, upon which is pivotally supported a pressure member 99. This comprises a metal plate 102, one end of which is bent into a loop 103 adapted to surround the pintle 97, an aperture 104 being formed centrally of this loop. A sheet metal spring 105 is attached to the plate and fits in this recess, engaging the groove in the pintle and securing the pressure member against accidental removal therefrom, while permitting its ready removal when desirable.

The end of pintle 97 is beveled as shown at 97', and the outer wall of groove 98 is beveled as shown at 98', this beveling being so located that when the pressure member is at the angle shown in Fig. 6, it may be readily inserted or removed, the spring 105 riding up on the bevel. The central part of plate 102 is struck out so that there is formed a rectangular frame, the side edges of which are struck down to form flanges 107. Across the central portion of this frame is secured a crossbar 106, which carries a bowed sheet metal spring 111. A plate of sheet metal 108 with struck up side edges 109, which carry ears 110, turned over to engage the side edges of the frame, is held in position by the spring 111 and the ears. The frame has a channel 93' on its bearing surface so that it contacts the film at its edges only, and has slots 95' registering with 95 for the film engaging pins.

Upon side flange 107 nearer the door 20 so as to be readily accessible a spring latch is mounted. This consists of a spring 112 secured to flange 107 at 113 and having a short lug 114 extending through aperture 115 in the flange and at the end a longer lug 116 with a beveled end 117 extending through aperture 118 in the flange. On the plate 91 is a sheet metal plate 119 having an up struck flange 120 with an aperture 121, which the lug 116 engages. It may be released therefrom by pressure on lug 114 and engages it automatically when the pressure member is closed. A handle 126 curved so that it will form a guide for the film is provided. Handles 127 are also provided on pressure members 87.

It is possible that the film being pressed into engagement with the sprocket wheel would sometimes tend to stick and be carried by the wheel beyond the proper point, causing trouble. The final perforated end of the rear strip after passing roller 79 might whip around and be caught on its rear surface by a tooth and dragged in a backward direction. To avoid such accidents, I provide two guard plates 122 and 123, extending some distance from the wheel so as to insure the guidance of the film to a safe point and they have extensions 124 and 125 respectively extending between the flanges of sprocket 38.

The operation and functions of the mechanical parts of my camera will be evident from a perusal of the above description thereof, but certain features thereof of particular importance to an unskilled user may be emphasized, and the operations that the user performs in taking a series of pictures enumerated.

While the dimensions of the camera are not of great importance, it is designed for a film having a width of 16 mm. with a picture area substantially one-sixth of that of the "standard" area. The film will be marketed in reels 71 having fifty feet of sensitized film with leader and end strips four feet in length. These will be sold as articles of merchandise as are ordinary camera film spools now. Each reel will have a central core with a slot 128 and lug engaging aperture 70 (see Fig. 6). The user will open the door 20, thus opening the entire side of compartment 30 and rendering all parts of it accessible. He will then place an empty spool 68 on the take up spindle and a full one on the supply spindle, which is a very simple operation, as the free ends of both protrude toward the door. The roller 90 at the end of the pressure member 87, which will have been held clear during the insertion of the spool, will be permitted to bear against the spool, preventing any undesired unwinding thereof. The end of the leader may be attached to the take up spool 68 before insertion into the camera or it may be at this time drawn from the supply spool and inserted in the slot 128 in spool 68, leaving a loop between the spools, or such a loop with a free end may be formed. The pressure members 77 are operated by latch handles 81 to the position out of contact with the sprocket wheel 38, leaving therebetween spaces open toward the door. The pressure member 99 is unlatched from the gate and swung away therefrom, it remaining open of its own weight, leaving a space open toward the door. There are thus left the three spaces all open toward the door, permitting the insertion of the loop of leader strip in an edgewise direction into all three by a single operation. The amount of slack to be left between the sprocket and the gate is not an exact one, but may vary within reasonable limits so that only the most ordinary degree of care is needed in inserting the film. Since the same sprocket feeds the film in both directions, the amount of slack originally given will not be changed during use. As the leader strip will be perforated like the film, it will be placed on the teeth of the sprocket and in engagement with the advancing pins at the gate.

If the end of the loop is left free until it is in position in the mechanism, and the pressure members in operative position, it may be then attached to the take-up spool. The indicator which is shown to read 50 feet will be set at 46 before use. The camera will then be prepared for use and the door closed, and the four feet of leader strip wound through. When the indicator points to "50", the film is ready for exposure and when it has run the circle and again reads "50", it will be exposed and the four feet of end strip will be run through. The full spool can then be removed.

While I have described this mechanism as embodied in a motion picture camera intended primarily for unskilled users, it is obvious that it will be useful for all apparatus of this type wherein it is desirable that film be conveniently placed in position and moved past an operating position, such as the gate in the present disclosure, whatever may be the operation performed or whatever the skill of the user.

Where, in the claims, reference is made to "film", it is to be understood that this term is used as a short and convenient one including the material used as leader and strips and including any material that may be used as the substance of the long strip fed through the machine.

Having thus described my invention what I claim as new and desire to secure by Letters Patent is:

1. In apparatus of the type described, a casing, a door in one side of the casing, mechanism for advancing film past and holding it in an exposure position, said mechanism including a gate and a member for pressing film against said gate, a recessed lug parallel to the gate with a free end toward said door, the pressure member being pivotally mounted on said lug and a spring on said pressure member and engaging a recess in said lug whereby the member is normally held in place but permitting the ready removal thereof, a latch for holding the pressure member in film pressing position, said latch being on the side toward the door so as to be readily accessible therefrom, said pressure member when swung on the pivot being entirely free from said gate and leaving therebetween a space open toward said door into which film may be inserted in an edgewise direction.

2. Apparatus of the kind described comprising means for supplying and means for taking up a long strip of perforated film, an operating station, a single sprocket wheel for feeding the film from the supply means to the station and from the station to the take-up means, said sprocket wheel having edge flanges carrying teeth and engaging the film at its edge portions only, means for pressing the film against the flanges to insure the operative engagement of the teeth and the perforations of the film and plates on each side of said sprocket extending between the flanges thereof and also extending outwardly from said sprocket and adapted to insure the separation of the film from the sprocket as it is fed thereby in both directions.

3. In apparatus of the type described having means for supplying and taking up film, and a gate member, a member for pressing film against said gate member, a lug parallel to the plane of the gate and having a circumferential groove, the pressure member being pivotally mounted on said lug and a spring on said pressure member and engaging the groove in said lug whereby the member is normally held in place and permitting the removal thereof, said groove having on one wall a beveled portion at an angle to the plane of the gate whereby when the pressure member is tilted to a certain position from the gate it may be more readily removed from the pintle, and a latch on the pressure and gate members for holding the pressure member in film pressing position, said pressure member when unlatched and swung on the pivot leaving a space between it and the gate into which a film may be inserted in an endwise direction.

Signed at Rochester, New York, this 29th day of April, 1920.

J. TESSIER.